Figure 1:
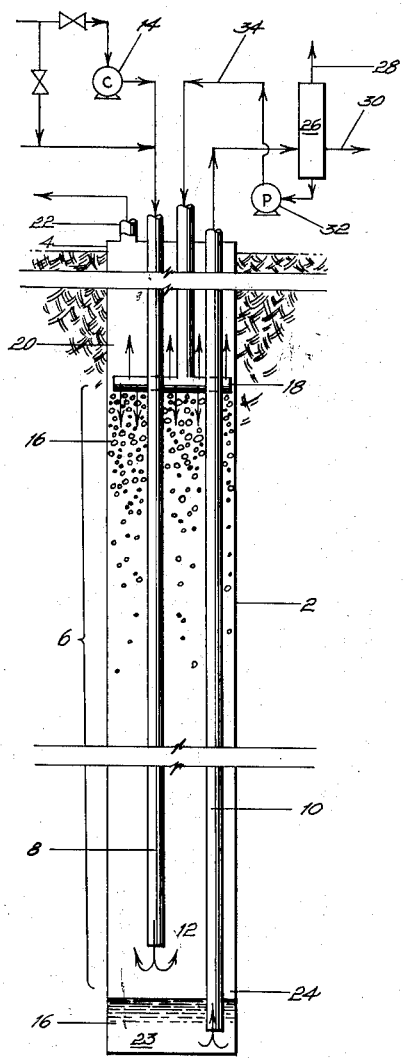

July 16, 1963 W. M. DOTTS. JR., ETAL 3,097,917
METHOD FOR HIGH PRESSURE SELECTIVE ABSORPTION OF GASES
Filed April 19, 1961 4 Sheets-Sheet 1

INVENTORS
WALTER M. DOTTS, JR.
WAYNE E. STEVENS
BY John Gibson Semmes
ATTORNEY

July 16, 1963  W. M. DOTTS. JR., ETAL  3,097,917
METHOD FOR HIGH PRESSURE SELECTIVE ABSORPTION OF GASES
Filed April 19, 1961  4 Sheets-Sheet 2

INVENTOR
WALTER M. DOTTS, JR.
WAYNE E. STEVENS
BY John Gibson Semmes

ATTORNEY

July 16, 1963 W. M. DOTTS, JR., ETAL 3,097,917
METHOD FOR HIGH PRESSURE SELECTIVE ABSORPTION OF GASES
Filed April 19, 1961 4 Sheets-Sheet 3

INVENTORS
WALTER M. DOTTS, JR.
WAYNE E. STEVENS
BY *John Gibson Semmes*

ATTORNEY

United States Patent Office 3,097,917
Patented July 16, 1963

3,097,917
METHOD FOR HIGH PRESSURE SELECTIVE ABSORPTION OF GASES
Walter M. Dotts, Jr., Richmond, Va., and Wayne E. Stevens, El Paso, Tex., assignors to Development, Ltd., Midland, Tex., a partnership
Filed Apr. 19, 1961, Ser. No. 104,164
20 Claims. (Cl. 23—2)

This invention relates to a method for treating a gaseous mixture to change the concentration of a component thereof, particularly a method for such treating wherein said mixture is contacted countercurrently at high pressure with an absorbent having a preferential absorbing capacity for said component throughout a treatment zone contained in a downwardly extending hole in the earth.

This application is a continuation-in-part of applicants' co-pending application Serial Number 33,655 for Method for High Pressure Treating of Gaseous Mixtures, filed June 3, 1960, now abandoned.

The volume of natural and industrial gases treated for various purposes has increased tremendously in recent years. For example, it is reported that natural gas production in the United States alone amounted to 11.5 trillion cubic feet in 1958 and, prior to treatment, a large fraction of this gas contained corrosive, air-polluting, or otherwise undesirable ingredients requiring removal before it could be sold in commerce. Natural gas from the purest available sources is normally marketed before the gas requiring treatment. As uncontaminated gas reserves are depleted, the percentage of gas produced which requires treating will continue to increase.

In addition to natural gas, there are other gases which require treating to remove impurities. Among those presently treated are nitrogen, hydrogen, ethylene and many other synthesis, refinery and manufactured gases. Impurities encountered include hydrogen sulfide, carbon monoxide, carbon dioxide, sulfur dioxide, ammonia, chlorine, silicon fluoride, hydrogen fluoride, and hydrogen chloride. Advances in technology and industrial progress will continue to increase the number and volume of gas streams requiring such treatment.

Frequently, gaseous mixtures comprising constituents other than impurities can be upgraded by separation into streams richer in a particular component. For example, natural gas often contains substantial percentages of heavier hydrocarbons like butane, propane, pentane, and natural gasoline. Separated from the natural gas, these constituents take on values much higher than they possess as components of natural gas. For another example, light olefins, namely acetylene, ethylene and propylene, are more valuable apart from hydrogen and other products of paraffin cracking reactions whereby they are generally produced. For another example, atmospheric air comprises nitrogen, oxygen and argon, each of which is more valuable when present in higher concentration or separated from the others.

Accordingly, it is an object of this invention to provide a method which enables more economical and convenient treating of gaseous mixtures to change the concentrations of components thereof by absorbing such components selectively at higher throughput rates than heretofore practicable in absorbents from which these components can be liberated simply by lowering pressure.

It is another object of this invention to provide a method which enables purification of several natural and industrial gas streams more economically than heretofore.

Another object is to provide a method which accomplishes more efficient removal from gaseous mixtures of constituents present in minor concentrations by making practicable selective absorption of such constituents at high flow rates in readily denuded absorbents.

Another object is to make selective absorption using easily renewed absorbents practicable at high throughput rates by providing a method whereby maximum concentration driving force is maintained at all points of contact between such absorbents and components being absorbed in contacting zones of such great length and operating at such high pressure throughput that higher absorption rates are achieved in combination with longer contact times than heretofore commercially feasible.

Another object is to provide a method which enables more efficient separation of gaseous mixtures using readily denuded absorbents by operating at high pressures throughout treatment vessels of unprecedented length, actual as well as effective, which do not require elaborate supporting structures or consume valuable space and require extensive piping, pumping and compression.

Another object is to enable economical selective absorption with easily renewed absorbents by providing a method which utilizes holes in the earth containing treatment vessels of great length and volume operating at high pressures throughout to achieve higher throughput capacities.

Another object is to provide a method which enables more economical treating of a gaseous mixture to change the proportion of a component thereof by contacting said mixture countercurrently at higher pressure than heretofore practicable at high flow rate with a spray of readily renewed absorbent in a treatment zone confined to a substantially vertical hole in the earth.

Another object is to achieve efficient gas treating using absorbents which can readily be denuded near ambient temperatures by providing a method enabling utilization of the major portion of the volume of a downwardly extending hole in the earth for countercurrent contacting with a liquid column of absorbent, thereby obtaining higher hydrostatic pressure at any depth for a given gas flow rate to achieve higher throughput capacity.

An object of a specialized form of this invention is to provide a more economical method for treating sour natural gas to remove sulfurous impurities, carbon dioxide, or both by high pressure selective absorption in a hole in the earth, using liquids from which the impurities absorbed therein can be flashed or stripped near ambient conditions.

An object of another specialized form of this invention is to provide a method for recovering butane, propane, natural gasoline and other heavier hydrocarbons from wet gas streams by absorption in a liquid hydrocarbon at high pressure in a hole in the earth.

An object of another specialized form is to provide a method utilizing a plurality of superposed treatment zones in a single hole in the earth for multi-stage treating of gaseous mixtures.

An object of still another specialized form of this invention is to provide a method for treating natural gas as it flows through a well bore to the surface from a formation in the earth.

An object of another specialized form is to provide a more economical method for decreasing the concentration of an acid gas in a gaseous mixture containing the same and hydrogen by contacting said mixture countercurrently at high pressure with a readily renewable absorbent having a preferential absorbing capacity for said acid gas throughout a treatment zone contained in a hole in the earth.

An object of another specialized form is to provide a more economical method for removing an acid gas from a gaseous mixture containing the same and nitrogen by selective absorption of said acid gas in a readily denuded absorbent at high pressure in a hole in the earth.

An object of another specialized form is to provide a more economical method for removing a light olefin from a gaseous mixture containing the same and hydrogen by selective absorption of said olefin in an easily renewable absorbent at high pressure in a hole in the earth.

An object of yet another specialized form of this invention is to provide a method for treating air at high pressure to produce a nitrogen-enriched stream and an oxygen-enriched stream by selective absorption of oxygen in said air in an easily renewed absorbent in a treatment zone contained in a hole in the earth.

Additional objects of the invention will become apparent from ensuing description.

To change the concentration of a component thereof, a gaseous mixture may be brought into contact and "scrubbed" with a treating liquid which has a preferential absorbing capacity for that component and from which the component can be liberated simply by lowering pressure. A treating liquid with these characteristics can readily be renewed for use again. In general, the solubility of any gas in a liquid increases with the partial pressure of the gas to be absorbed. Accordingly, to obtain optimum treating capacity, scrubbing operations are carried out at the highest attainable pressures commensurate with the costs of gas compression, liquid pumping and high pressure vessels. In many cases, where the component to be absorbed is only slightly soluble in the available liquid, or where purity specifications for the treated gas are high, pressure requirements are high enough to render very costly the employment of a selective physical absorption process in conventional equipment. As a practical, though nevertheless still costly alternative in purification, the impurities must be removed by contact and reaction with a chemical solution such as one of the alkanolamines. After contact, the chemical solution must be regenerated prior to its reuse in the contacting vessel. The amount of chemical consumed and the extent of the regeneration facilities required in such a process increase rapidly with increasing concentrations of impurities in the gas to be treated. Therefore, the cost of treating increases sharply with increasing proportions of impurities in the feed gas.

It is concentration difference which drives absorption. At any plane of contact perpendicular to the direction of flow through a treatment vessel, the rate of transfer of a component of a gaseous mixture to an absorbent is proportional to the difference between the concentrations of the component in the gaseous mixture and the absorbent, respectively, at that plane. The greater the concentration difference, the greater the force driving absorption and, in turn, the greater the absorption rate. Maximum average concentration difference throughout a treatment vessel is achieved by introducing the gaseous mixture to be treated and the absorbent at opposite ends of the vessel, flowing them countercurrently through the vessel, and removing the resulting effluents separately at ends opposite from which they entered the vessel as the mixture and absorbent. It is this technique, termed countercurrent contacting, which assures maximum overall absorption rate for a given rate of contact.

Countercurrent contacting also assures that the last absorbent encountered by the gaseous mixture before it leaves the vessel is fresh absorbent. Thus, unlike cocurrent contacting or contacting by uniform mixing throughout the vessel, countercurrent contacting enables purification of the mixture, the degree of purity possible being limited only by the purity of the incoming absorbent and the contact time provided. Countercurrent contacting is far more efficient than other types of contacting because it affords a much greater overall absorption rate for a given contact rate. Countercurrent contacting is essential to obtain any practical degree of purification.

The percentage of a gaseous mixture which is absorbed during passage through a treating vessel also varies directly with the time it is in contact with absorbent present during such passage. Furthermore, it is a direct function of the rate of such contact. Contact time may be increased by enlarging the internal cross-section of the vessel or lengthening the vessel. Ideal countercurrent contacting is more nearly achieved if length rather than internal cross-section is relied upon primarily to obtain larger volume and, thus, longer contact time for a given throughput. Contact rate may be increased by raising pressure.

Conventional vessels capable of withstanding high pressures must be fabricated of special alloys and have thick walls. As the internal cross-section of such a vessel is increased, the wall thickness required increases exponentially. Thus, conventional pressure vessels of useful cross-section are very expensive. Alternatively, lengthening such vessels increases substantially the cost of supporting structures. Effective length may be increased by utilizing multiples of such vessels. However, this consumes valuable space, and requires extensive piping, pumping and compression.

Additionally, a considerable investment in powerful machinery is required to provide conventional means whereby fluids can be delivered at high flow rates, at high pressure, for treating. It is particularly expensive and difficult to do so with a gas. Such expense, together with the high cost of fabricating large pressure vessels, are the factors which limit the pressures at which it is commercially feasible to treat gaseous mixtures by selective physical absorption.

The present invention provides a method whereby several of the gas streams cited above, and others, can be treated more economically and conveniently than heretofore by selective absorption utilizing easily renewed liquids at high pressures. It enables the use of direct absorbing liquids for many absorbing applications where costlier conventional equipment employing reagent chemicals is required in the prior art. As will become apparent from the following, the present method promises to make commercially practicable for the first time a processing installation utilizing simple facilities situated around one or more holes in the ground, which installation is less expensive to build and operate and is, in many respects, better able to perform tasks for which extensive and complex conventional installations entirely on the surface are now constructed.

While the present method is adapted to the treatment of a wide variety of gaseous mixtures, when high flow rate at high pressure is desirable, it is contemplated that a major field of its application is the treating of natural gas. Therefore, for purposes of illustration, but not limitation, this invention is described in the present application largely by reference to this specific field of utilization.

Figure 5:
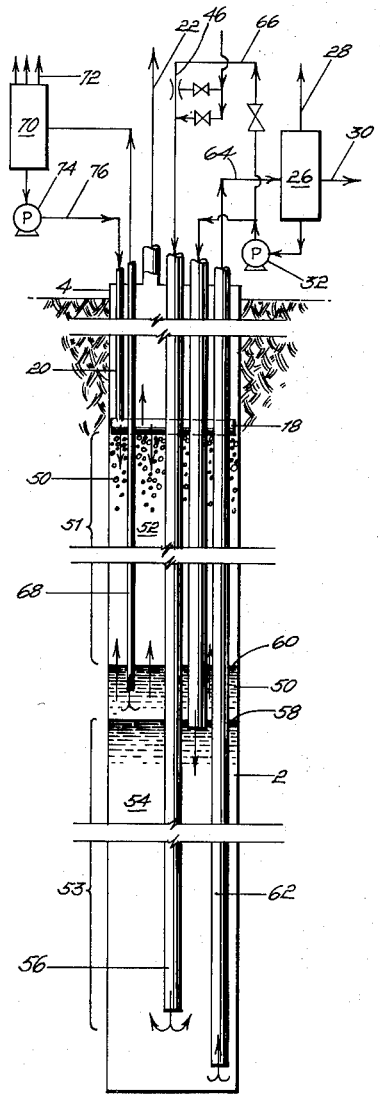
Figure 6:
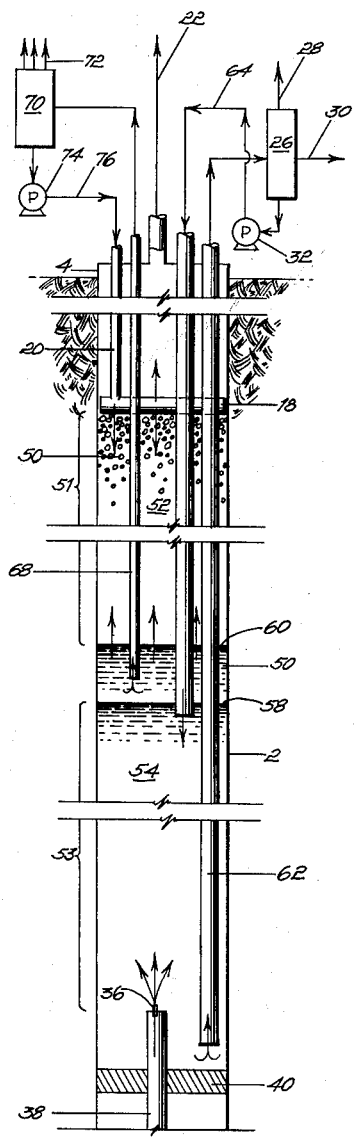

For the purposes of this specification and appended claims, it is intended that the synonymous terms "treating" and "treatment" comprise primarily selective physical absorption, for which the present method is particularly suited. However, it also has utility in applications wherein treatment of a gaseous mixture to change the concentration of a component thereof may better be accomplished by contacting said mixture with a liquid which reacts chemically to some degree with said component, and which requires regeneration to some extent, for example, by moderate heating, to condition the liquid for reuse. Accordingly, it is intended that the terms "treating" and "treatment" comprise selective chemical as well as a physical absorption, and that such terms as "readily denuded" and "easily renewed" described absorbents which can be desorbed simply, at or near ambient conditions, and which do not require expensive regeneration as, for example does glycol-amine. As will become apparent, the present method teaches how practicably to achieve at high throughput rates higher contact efficiency in combination with longer contact time at high pressure than is commercially feasible in conventional surface vessels. It is this teaching which enables wider use economically of readily renewable absorbents, and herein resides the primary advantage of the present method. However, the present method also has utility and promises to prove advantageous in applications wherein use of absorbents which are more difficult to renew is desirable. As will also become apparent, one such application is selective physical absorption of heavier hydrocarbons from natural gas, using as the absorbent a hydrocarbon oil. Fractionating such an oil to recover these heavier hydrocarbons following their absorption from the gas according to the present method requires considerable heat. Another such application is topping a gaseous mixture to remove final traces of a component the bulk of which has already been removed by contacting the mixture according to the present method with a readily renewable absorbent such as water. Such topping may conveniently be done chemically with, for example, an alkanolamine or hot alkaline carbonate solution in the upper stage of a multi-stage embodiment of the present method, as illustrated in FIGS. 5 and 6 and described with respect to another application below. Accordingly, while the present method promises to be particularly advantageous in those applications where it makes practicable utilization of readily renewable absorbents, it is not intended to limit its application to uses in conjunction with such absorbents.

The present method promises to be particularly useful when economic conditions favor treating pressures exceeding 300 p.s.i.a. (pounds per square inch absolute). In certain applications, when gaseous mixtures requiring treatment are not available at pressures of this order and such pressures are not necessary or advantageous for other reasons, for example, for pipeline transmission, the present method promises to be useful for treating at lower pressures. It is intended that the term "high pressure" as used herein means pressure in excess of 100 p.s.i.a.

It is also intended that the term "gaseous mixture" or, alternatively, "gas stream" as used herein include gases or a mixture of one or more gases and liquids in which the gas or gases constitute the continuous phase.

It is also intended that the term "acidic constituent" or, alternatively, "acid gas" means a component which is gaseous at or near ambient conditions, and which dissolves in water with the production of hydrogen ions. Acid gases most prevalent in natural gas are hydrogen sulfide and carbon dioxide. Other acidic constituents often found in natural gas are carbonyl sulfide and mercaptans. Acidic constituents commonly encountered in synthesis, refinery and other industrial gas streams include all of the foregoing and, in addition, such acid gases as sulfur dioxide, chlorine, hydrogen chloride, hydrogen fluoride, silicon fluoride and hydrogen cyanide.

It is further intended that the terms "heavier hydrocarbons" or, alternatively, "liquid hydrocarbons" mean hydrocarbons except methane.

As will become apparent, selective absorption according to the present method may be conducted in either of two general types of embodiments. One such type incorporates a spray column in the downhole treatment portion and the other what is termed a liquid column herein. The embodiment best selected depends, as will be demonstrated, on the application concerned. It is intended that the term "spray column" as used herein describe one in which large liquid surface area is exposed to contact with gases or vapors and which exerts no appreciable hydrostatic pressure at any point in said column. By "liquid column" is intended one which is occupied to a larger extent by liquid, wherein the weight of confined liquid, bearing on itself, exerts appreciable hydrostatic pressure. In all or a portion of the latter, liquid is generally the continuous phase. Throughout the former, gas or vapor is always such.

In a spray column, treating pressure is essentially the same throughout, decreasing toward the top thereof only slightly due to nominal friction losses. On the other hand, when economic considerations favor a liquid column, it is necessary to take a significant pressure drop through the column. Whether a spray or liquid column is utilized, in those applications where the present method promises to be particularly useful, minimum as well as maximum pressures within the treatment zone and elsewhere in the annulus of the treatment vessel will exceed 300 p.s.i.a. However, when a liquid column holds the advantage, pressure at the top thereof will be significantly below maximum pressure and, in some applications, may be substantially below 300 p.s.i.a. while at the same time acting to enhance treating capacity and conserve treated gas discharge pressure. Accordingly, it is intended that the term "high pressure" as used herein be interpreted literally with respect to spray columns, but more liberally with respect to liquid columns, i.e., high pressure at the base thereof, in recognition of the fact that pressure decreases by the hydrostatic component thereof as the top of the liquid column is approached. Further, it is intended that the term "substantially in excess of atmospheric pressure," as used herein means absolute pressure of at least 3 times atmospheric pressure.

According to the present method, the gaseous mixture to be treated is flowed through a hole in the earth, which hole, preferably in most cases the major portion thereof, may serve, as will be demonstrated, as a low cost, high pressure treatment vessel. During said flowing, said mixture may be contacted countercurrently throughout a treatment zone contained in said vessel with a spray of absorbent having a preferential absorbing capacity for a component of said mixture. Alternatively, a liquid column of such an absorbent which, practically, may be several hundreds or thousands of feet long within such a hole, may be utilized for countercurrent contacting in said hole to provide, when advantageous, within such a column, higher pressure hydrostatically for treating. High volume pumping and compressing means are utilized adjacent to such a hole to introduce inputs and maintain high pressure therein. The inputs so introduced flow through such a hole wherein, as will become apparent, desirable high flow rates at high pressure may be achieved more conveniently and more economically than heretofore. Subsequent to such countercurrent contacting of said mixture, absorbed and unabsorbed components thereof are recovered separately from said hole for further processing, or delivery, as desired.

As will be demonstrated, it is precisely this combination of steps, carried out in the manner and by the means set forth that promises to render high pressure selective absorption in a downwardly extending hole in the earth a more economical solution to a serious industrial problem.

Illustrated schematically in FIGURES 1 through 6 are embodiments of the present method adapted to several of the many treatments practicable according to the present method. Each embodiment comprises a surface charging and recovery portion and a downhole treating portion.

FIGURE 1 is a schematic view, partially fragmentary, of an embodiment incorporating a spray column in the downhole treating portion which is adapted to treat gaseous mixtures by selective absorption, for example, to remove hydrogen sulfide from natural gas. It may also be used to absorb liquids from gases, for example, to remove liquid hydrocarbons from natural gas. In this embodiment, the gas stream to be treated is introduced to the bottom of the treatment zone via conduit 12 extending downwardly from the surface and absorbent 16 is introduced via spraying device 18 positioned at the top of treatment zone 6.

Figure 2:
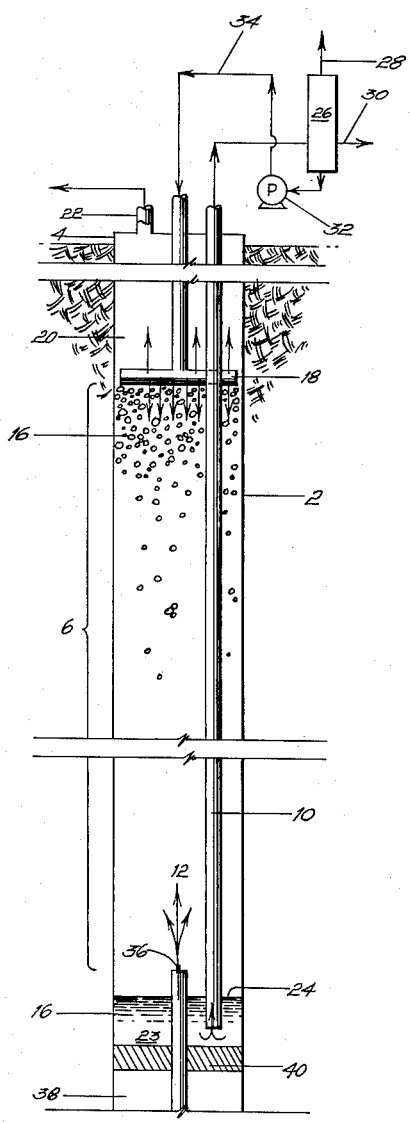

FIGURE 2 is a schematic view, partially fragmentary, of an embodiment which also incorporates a spray column in the downhole treating portion. FIGURE 2 differs from FIGURE 1 in that it illustrates an alternative means of introducing the gas stream to be treated, from a formation in the earth below the downhole treating portion.

Figure 3:
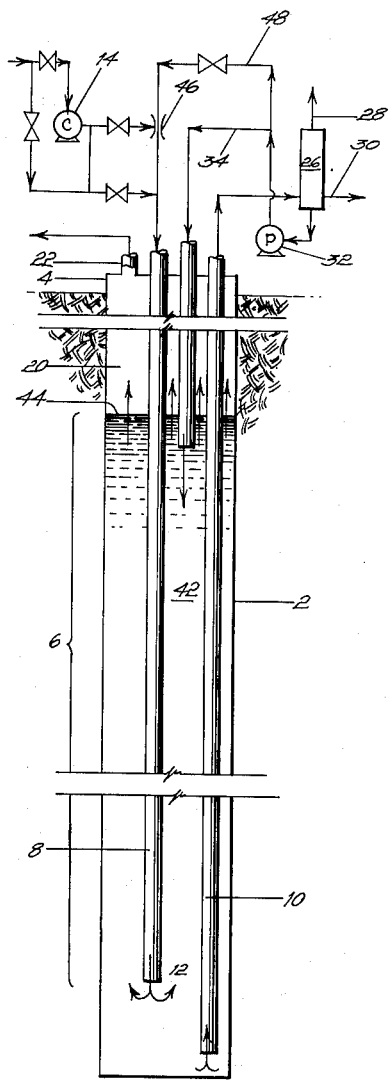

FIGURE 3 is a schematic view, partially fragmentary, illustrating another variation of FIGURE 1. In this embodiment the downhole treating portion incorporates a liquid column instead of a spray column, to which the gas stream to be treated may be charged directly via conduit 12, or by entrainment by means of a mixing nozzle 46 positioned in conduit 12.

Figure 4:
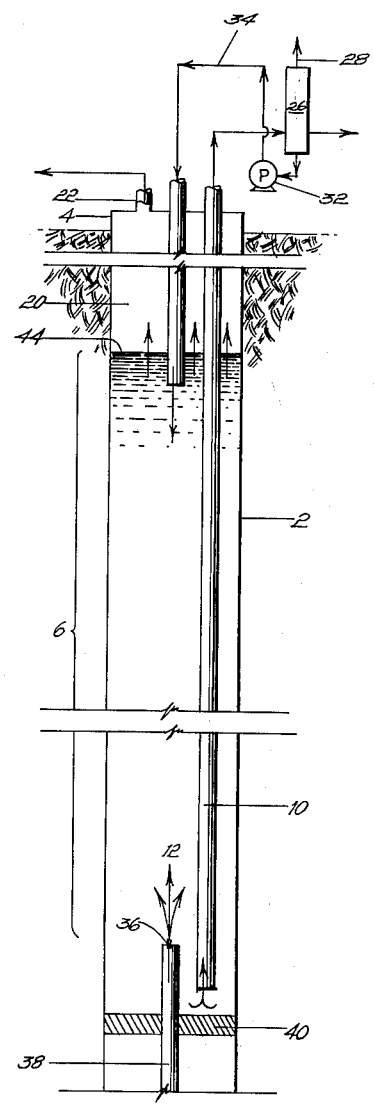

FIGURE 4 is a schematic view, partially fragmentary, illustrating a modification of the embodiment incorporating a liquid column shown in FIGURE 3 which is adapted, in the same manner as FIGURE 2, for feeding of gas for treatment from a formation in the earth below.

FIGURE 5 is a schematic view, partially fragmentary, which illustrates an embodiment of the present method incorporating two treatment zones 51 and 53 superposed in a single hole, the former incorporating a spray column and the latter incorporating a liquid column. Such zones are designed in this instance to operate in series and this embodiment may be utilized to separate gases in the lower treatment zone and to separate liquids from gases in the upper treatment zone.

FIGURE 6 is a schematic view, partially fragmentary, of an embodiment like FIGURE 5, except that FIGURE 6 is also modified to enable introduction of fluid to be treated from below the downhole treating portion.

Figure 7:
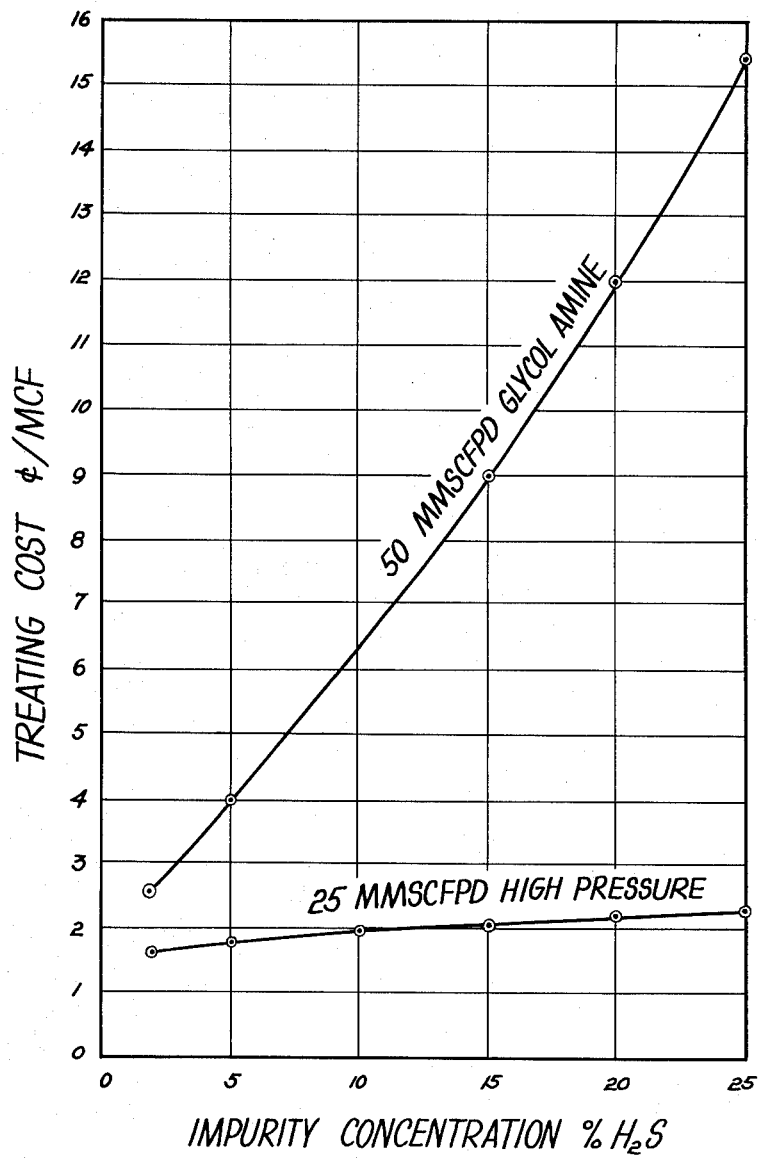

FIGURE 7 summarizes graphically the operating characteristics of the present method in contrast to one typical of the prior art employing reagent chemicals by comparing the calculated cost, including shrinkage, of removing various concentrations of hydrogen sulfide from sour natural gas by the present method, as opposed to such removing by the most economical method (glycol-amine) in common use in the United States.

Referring to FIGURE 1 by way of example, such an embodiment may incorporate casing 2 set in a borehole drilled in the earth, and closed at its top by closure 4 and at its bottom to form a treatment vessel confining treatment zone 6. Inside casing 2 may be suspended conduits 8 and 10. A gaseous mixture 12 to be treated may be conveyed through conduit 8 at high pressure to a point near the bottom of treatment zone 6. When said mixture is not available at sufficient pressure to be introduced to treatment zone 6, additional pressure may be supplied at the surface by use of conventional compressing means 14.

Treatment zone 6 may be utilized as a spray column. To do so, selective absorbent 16 is sprayed in at the top of treatment zone 6, making countercurrent contact with mixture 12 rising to be treated.

Treated gas which carries absorbent 16 above treatment zone 6 disengages from absorbent 16 in space 20 above spraying device 18, from which said gas may be removed through outlet 22 for further processing, or delivery, as desired.

Absorbent 16 with its absorbed components accumulates in reservoir 23 at the bottom of treatment zone 6. From reservoir 23 absorbent 16 is forced by treatment zone pressure back to the surface through return conduit 10. Flow of absorbent 16 from reservoir 23 is controlled so as to maintain absorbent level 24 above the lower end of conduit 10. At the surface, products absorbed in absorbent 16 may be removed therefrom in conventional separating equipment 26. Products so separated as gases may be removed from separating equipment 26 through outlet 28 and processed, or delivered, as desired. Products separated as liquids may be removed through outlet 30. Denuded absorbent leaving separating equipment 26 may be recirculated through treatment zone 6 via pump 32 and conduits 34.

FIGURE 2 differs from FIGURE 1 in that it illustrates a varient means of charging mixture 12 to treatment zone 6. When mixture 12 is available at sufficiently high pressure from, for example, a natural gas well, a portion of the casing of such well above the producing formation may be utilized as treatment zone 6 and mixture 12 may be introduced to the bottom of treatment zone 6 through restriction 36 in conduit 38, fixed by such means as packer 40 below treatment zone 6. The variation illustrated in FIGURE 2 results in elimination of conduit 8 and compressing means 14, shown in FIGURE 1.

For certain applications, for example, to remove carbon dioxide from natural gas, it will become apparent that it may be advantageous to operate treatment zone 6 as a liquid column instead of a spray column. For such operation, the present method may be embodied as illustrated in FIGURE 3, wherein casing 2 may be filled to some point with liquid absorbent 42, the top of which is shown at liquid level 44. In this embodiment, mixture 12 is again conveyed at high pressure via conduit 8 to a point near the lower end of treatment zone 6. When mixture 12 is not available at sufficient pressure to be introduced to treatment zone 6, additional pressure may be supplied at the surface, again by use of conventional compressing means 14. Alternatively, it may be desirable to combine mixture 12 and a portion of absorbent 42 prior to introduction by entrainment, utilizing a conventional device such as mixing nozzle or jet educator 46. An advantage of this technique is that the hydrostatic head of the liquid in which mixture 12 is entrained in conduit 8 by mixing nozzle 46 aids in compressing mixture 12 to the pressure existing under the liquid column in treatment zone 6.

In either case, from the lower end of conduit 8, mixture 12 rises in treatment zone 6, contacting absorbent 42 countercurrently. Treated products which are gaseous and rise through treatment zone 6 carrying liquid absorbent 42 separate from absorbent 42 in space 20 above liquid level 44, from which they may be removed through outlet 22 for further processing, or delivery, as desired. Liquid absorbent 42 and any products absorbed therein, may be withdrawn near the bottom of treatment zone 6 and conveyed by treatment zone pressure to ground level through conduit 10, which may terminate below the lower end of conduit 8.

At the surface, products absorbed in absorbent 42 may be removed therefrom and absorbent 42 recirculated in the same manner outlined above in describing FIGURES 1 and 2. If desired, a portion of recirculating absorbent 42 may be diverted via conduit 48 through nozzle 46 and used therein for entraining mixture 12.

FIGURE 4 differs from FIGURE 3 in the same manner that FIGURE 2 differs from FIGURE 1. If the method is embodied as illustrated in FIGURE 4, mixture 12 may be introduced to the bottom of treatment zone 6 through restriction 36 in conduit 38, eliminating conduits 8 and 48, compressing means 14 and mixing nozzle 46 shown in FIGURE 3.

For certain applications, a multi-stage embodiment according to the present method becomes advantageous. Such an application is treating sour natural gas which also contains valuable heavier hydrocarbons. Such an embodiment is illustrated in FIGURE 5. Here, two immiscible absorbents of different densities and preferences may be used in series. For example, lean oil 50 may be used in spray column 52 above water column 54 confined in casing 2 to constitute treatment zones 51 and 53 respectively. Sour wet gas is forced to a point near the bottom of casing 2 via input conduit 56. As said gas rises from said point, contacting water column 54 countercurrently, the water soluble impurities, like hydrogen sulfide, are absorbed. The remaining wet natural gas continues to rise, past water-oil interface 58, through oil 50 accumulating below oil level 60 and into treatment zone 51 incorporating spray column 52. In treatment zone 51 the heavier hydrocarbons are absorbed in lean oil 50 directed downwardly from spraying device 18, and the remaining sweet dry gas passes into space 20. From space 20, the treated gas is recovered through closure 4 via outlet 22 for further processing, or delivery, as desired. Sour water is removed from the bottom of casing 2 via conduit 62 and is flashed or stripped in conventional separation equipment 26, where the absorbed impurities are recovered and discharged through conduits 28 and 30, in the manner described previously with reference to other embodiments of the present method. The denuded water is recirculated via pump 32 and conduit 64 to the top of water column 54. A portion of the denuded water may be diverted via conduit 66 to entrain incoming sour wet gas in conduit 66 by means of mixing nozzle 46. After enrichment, oil 50 is removed from below oil level 60 via conduit 68 and conveyed to conventional fractionating means 70 where the absorbed hydrocarbons are removed and recovered through outlets 72. Denuded lean oil 50 is then recirculated via pump 74 and conduit 76 to spraying device 18 at the top of spray column 52. Operating conditions, including relative lengths of the treating zones, vary with the volume of gas to be treated, its content of impurities and heavier hydrocarbons, and product specifications. If desired, a chimney plate (not illustrated) or equivalent may be positioned between treatment zones 51 and 53. Such a device enables utilizing a spray or liquid column in either of such zones, and enables use of miscible absorbents in series. It also enables using an absorbent in treatment zone 51 which is of greater density than the absorbent used in treatment zone 53.

Illustrated in FIGURE 6 is an embodiment of the present method identical to that illustrated in FIGURE 5 except that provision is made for introducing the gas from below, in the same manner as illustrated in FIGURES 2 and 4. This modification permits elimination of conduits 56 and 66, and mixing nozzle 46, shown in FIGURE 5.

Because conventional treatment vessels on the surface are limited practically as to height, large cross-sectional areas are required to provide adequate contact times and enable reasonable approaches to equilibrium at commercial rates of flow. However, in open towers of large cross-section, channeling of gas and liquid occurs. This reduces contact efficiency, which is critical in short towers for most applications. Because of channeling, open spray and liquid columns were abandoned commercially years ago, except for those applications such as cooling and dehumidification where transfer performance is not critical and one or two theoretical transfer units per tower is adequate to the task. To overcome channeling in conventional towers, packing, plates or similar devices are installed. However, because these devices occupy a substantial fraction of tower volume, their use necessitates increased investment per unit of treating capacity, over and above the cost of the devices themselves. Use of these devices also increases maintenance costs, and causes higher pressure drops through the towers.

On the other hand, a "high" treatment zone in a deep hole in the earth affords unprecedented length of travel in countercurrent contact as well as long contact time, making contact efficiency per unit of height less critical. Since concentration gradients in both the gas stream and the liquid stream over the length of such a high treatment zone are small, considerably greater local mixing and internal recirculation is tolerable. Turbulent flow conditions exist at commercial flow rates in a treatment zone downhole, preventing channeling within the range of cross-sectional areas devoted to contacting which are usually optimum downhole and promoting effective contacting. Thus, a close approach to equilibrium is obtainable, without reliance on packing or other obstructions, in long downhole treatment zones of this range of effective cross-sections. How practicably and conveniently to achieve the foregoing known advantages of using, in cooperation with countercurrent contacting, a very long column, the vertical dimension of which is many times the square root of the effective cross-sectional area thereof, for treating is the primary object and teaching of the present method.

When a high liquid column is employed, a significant contribution to treatment zone pressure is obtained from the hydrostatic head of the liquid column. When a spray column is employed, the gas stream to be treated can be introduced to the bottom of the treatment zone at just above casinghead pressure. Whether a downhole treatment vessel confines a liquid or spray column, gas throughput capacity is considerably higher than would be expected from ordinary loading and flooding calculations, since a long portion of the vessel above the treatment zone may conveniently be utilized for gas-liquid disengagement. Liquid entrained in the gas may be conveniently disentrained in the hole above the treatment zone, or on the surface, for example, in a knockout drum. Because the present method makes practicable treatment zones of great length in vessels capable of withstanding high pressures, treating capacities are exceptional in utilizations of the present method.

In those applications where larger than usually optimum cross-sectional areas devoted to contacting may prove advantageous and feasible downhole, contact efficiency may be increased by installing packing or baffles (not illustrated), in the case of the liquid column and, in the case of the spray column, packing baffles, and plates (not illustrated) as well. Some packing suitable for these applications, for example, plastic pall rings, may conveniently be installed and replaced hydraulically. Such conventional devices, and others such as distributors, mist eliminators, topping units, filters, dehydrators, heat exchangers, cooling towers, flash drums, evacuated tanks, power recovery turbines, and flow, pressure, temperature and liquid-level sensors and controllers (not illustrated) may be installed within or without the treatment zones afforded by the present method as appropriate for monitoring, controlling, automating and improving the efficiency of operations.

Specific applications of the present method are discussed below in connection with further examination of the embodiments illustrated. In addition, the economics of two such applications are contrasted with the economics of the prior art in their respective fields to summarize the operating characteristics of the present method and demonstrate the commercial advantages typical of utilizations of the present method. From the foregoing, it is apparent that, by virtue of the present method, a length of standard deep-well casing, for example, set in a bore hole and supported by the earth, may provide a treatment vessel capable of withstanding high pressures indefinitely, which treatment vessel is of great length, nominal wall thickness and low, production-line fabrication cost. A 16 inch casing set 1300 feet deep and utilized according to the present method provides more volume and throughput capacity than an 80 inch high-pressure vessel on the surface which is 50 feet high, at less than half the cost. Also by virtue of the present method, it is apparent that the weight of any long, substantially vertical column of liquid therein, bearing on itself, may provide hydrostatically and thus, cheaply, when advantageous, a useful portion of the pressure desired in a treatment zone therein to process gaseous mixtures more effectively.

Conventional commercial-scale absorbers generally range from 20 to 80 feet in height and from 2 to 8 feet in diameter. Greater dimensions have rarely proven economical, particularly for service at high pressures. In present commercial practice, ratios of absorber height to the square root of average cross-sectional area devoted to contacting generally range between about 11 and about 33. To exceed about 33 is to sacrifice capacity in a short tower. Absorber volumes greater than 4,000 cubic feet are uncommon in present practice. As already pointed out, ideal countercurrent contacting is more nearly achieved if length rather than internal cross-section is relied upon primarily to obtain larger volume and, thus, longer contact time for a given throughput. Consequently, the ratio of height to the square root of average cross-sectional area devoted to contacting is a measure of contact efficiency; volume is a measure of contact time and, within limits, the product of the two is a measure of treating capacity. A product of these factors of 45,000 is seldom exceeded conventionally. In high pressure absorbers on the surface, such products in excess of about 6,000 are costly to obtain. On the other hand, boreholes useable according to the present method can be of great depth, limited only by the economics and technical feasibility of boring such holes in the earth. Treatment zone length can be far greater than presently practical, extending to many thousand feet, and throughputs of many hundred gallons per minute (g.p.m.) and million standard cubic feet per day (MM s.c.f.p.d.) are readily obtainable therein at the pressures afforded by the present method. Treatment zone lengths exceeding 100 feet are necessary to obtain adequate contact times and contact efficiency at worthwhile throughput rates. The present method promises to be particularly useful when economic considerations dictate treatment zone lengths in excess of 250 feet. Treatment zone diameters feasible in well bores cased with standard-sized well casing generally range from approximately 4.5 inches to 19 inches. Larger diameters are entirely practicable, particularly at shallow depths. Length and diameter combinations should be optimized according to the investment and operating cost considerations characteristic of the particular process to which it is desired to adapt the method for high pressure treatment taught by the instant invention. As will become apparent, optimum such dimensions have been found to vary widely between embodiments for different applications of the present method. A ratio of treatment zone length to the square root of average cross-sectional area devoted to contacting which is greater than 33 is preferred for good results. When the object is to remove from the gas stream being treated essentially all of the component being absorbed, such a ratio of at least 100 is desirable. Such ratios as high as 3,000 and higher are readily obtainable according to the instant invention. Products of treatment zone volumes multiplied by such ratios which range to 6,000,000 and above are also readily obtainable by the present method.

Installations of the high pressure, high capacity treatment vessels made practicable by the present method may be accomplished utilizing, for example, conventional petroleum industry drilling and completion practices. Generally, casing tensile or collapse limits dictate reducing casing diameter with depth. Deep holes may be commenced by setting and cementing a surface string of large diameter, following which the hole may be drilled deeper and cased with one or more liners of decreasing diameter (not illustrated), which may be hung with packers on liner hangers (not illustrated) and cemented back to the hangers to secure durable pressure tight seals.

Maximum pressures available according to the present method in a treatment zone down a hole are a function of several factors, among them the length and cross-sectional area of the treatment zone, the overall specific gravity of the column in the treatment zone, the pressures at which the gas stream to be treated and the absorbent are introduced and friction losses in the system at the flow rates desired. In a hole of a given diameter, gas throughput capacity is increased by increasing treatment zone pressure. This results because increasing pressure increases the solubility of the component being absorbed in the absorbent and, thus, increases the treating capacity of a given throughput of absorbent. In a liquid column, increasing the pressure maintained on top of the column by a given amount may be made to increase bottom hole pressure still further, by forcing the gas present to occupy a smaller fraction of the column. In a liquid column of given height through which a gas stream is being passed at a given flow rate, the greater the average effective cross-sectional area of the column utilized for contacting the greater is the bottom hole pressure provided hydrostatically therein, because a larger fraction of the column is thereby occupied by liquid, increasing the overall specific gravity of the column. For some applications, one of which is described herein, economics dictates embodiments which do not rely, primarily, on pressures provided hydrostatically within the treatment vessel. Thus, in practice, hydrostatic heads of liquid columns may or may not provide a part of the pressure desired downhole for treating. In either spray or liquid column, maximum throughput capacity at a given pressure is achieved by utilizing the largest practicable portion of the total cross-sectional area available for contacting. Using the largest practicable portion of the height of a given hole for contacting assures more thorough treating for given rates of gas and absorbent flow by providing greater length of travel in countercurrent contact as well as longer contact time.

The cost of gas treating by selective absorption varies directly with the throughput of material it is necessary to absorb. The greater this throughput, the larger is the throughput of absorbent necessary and the more extensive is the equipment required for contacting, flashing and recirculating. Therefore, it is less costly to absorb components present in minor concentrations. Furthermore, the components which are absorbed must subsequently be removed from the absorbent by flashing at low pressure. When minor components are absorbed and pressure in the major stream is thereby preserved, savings are realized in compression. Accordingly, when treating a gas stream by selective absorption to change the concentration of a component, it is preferable under most circumstances to absorb a component present in minor concentration. When purification is the objective, it is essential to absorb the impurity. This is due to the fact that any liquid with a preferential absorbing capacity for one component of a gaseous mixture will also absorb all other components to some degree. The fraction of the contacted gas which is absorbed and then flashed from the absorbent contains all components in proportion to their respective solubilities in the absorbent and their concentrations in the contacted gas. As a result, an unabsorbed stream can be purified but an absorbed one cannot.

In some applications, the fraction of the contacted gas which is absorbed may contain a sufficient quantity of a component undesired in the absorbed fraction to justify recovering such component therefrom. This may be done conveniently by, for example, flashing the absorbent first at an intermediate pressure. The gas fraction recovered by this step will generally contain a higher concentration of the component undesired in the fraction absorbed than present therein prior to this step. Referring to FIGURE 1, in this embodiment the step would be carried out in an intermediate stage flash drum (not illustrated) situated between the exit of conduit 10 and separating equipment 26. The intermediate stage flash stream may be returned to the gas being contacted, if desired, by recompressing it in a recycle compressor (not illustrated) and reintroducing it to treatment zone 6 via conduit 12 or via an additional conduit (not illustrated) situated parallel to conduit 12 in casing 2 and terminating below the exit of conduit 12 and above absorbent level 24.

The present method promises to be of exceptional commercial value because it enables utilization of a low cost, high pressure treatment vessel of very large volume and throughput capacity, thereby making practicable utilization of higher pressure and longer contact time to achieve more efficient treating in many applications than heretofore commercially feasible. Using the present method, easily renewed absorbents can be saturated more thoroughly than heretofore practicable on a commercial scale.

Thus, absorbent requirements are reduced and absorbed components removed in a more easily recovered form. The components and auxiliary equipment required to construct installations designed to utilize the present method are off-the-shelf items in common use in the petroleum and chemical industries. Because of the simplicity of the method, it is suited to automated operation and control.

It will be further understood that treatment zones provided according to the present method may be contained by the earth itself, within any suitable hole in the earth, of which a bore hole is merely a preferred example, or may be contained within any suitable hole provided with a casing or other form of lining. Maximum capacity for a hole of given diameter requires that the treatment zone contained therein be bounded peripherally by the wall of the hole itself or its lining. Two or more holes may be inter-connected in such a manner that a gas stream recovered from a treatment zone in one hole may be introduced to another for additional treatment in series. Alternatively, two or more holes may be operated in parallel to provide greater capacity. Series and parallel operations utilizing two or more holes afford economies of scale in investment and operating costs associated with common surface equipment.

A typical utilization of the present method for the removal of hydrogen sulfide from natural gas is described in detail below, and an economic comparison with conventional processes follows. Cost information is summarized in Table I below. A graphical presentation, FIGURE 7, contrasts the calculated cost of treating sour natural gas according to the present method with the cost of doing so using the most common conventional method, for various concentrations of hydrogen sulfide in the gas. FIGURE 7 makes it evident that the present method promises substantial savings in natural gas treating costs, the savings increasing with increasing concentrations of hydrogen sulfide.

Again referring to FIGURE 1, 25 MM s.c.f.p.d. of sour natural gas containing 15% hydrogen sulfide, flowing at 80° F. and a pipeline transmission pressure of 1050 p.s.i.g. is introduced through 4½ inch conduit 8 to a point near the bottom of treatment zone 6 confined to approximately 1,000 feet of 20-inch casing 2 set and cemented to the surface in a 24-inch borehole. The natural gas is treated as it rises countercurrently to spray of absorbent 16 and is removed from the top of casing 2 through outlet 22 at 1,000 p.s.i.g. for return to the pipeline or further processing, as desired. Space 20 above spraying device 18 enables disengagement of any portion of absorbent 16 which may be carried above treatment zone 6.

Spray of absorbent 16, water in this example, falls from the top of casing 2 to the bottom, being replenished at the top via spraying device 18 and forced from the bottom by treatment zone pressure via 6-inch conduit 10, which delivers it to separating equipment 26 where the absorbed hydrogen sulfide is flashed or stripped from absorbent 16 at atmospheric pressure. The denuded absorbent is then recirculated in casing 2 by means of pump 32 and conduit 34. Power recovery means (not illustrated) may be utilized in conjunction with separation equipment 26 to recover from the absorbent and the absorbed hydrogen sulfide a considerable part of the power necessary to drive pump 32 and auxiliary equipment.

In this installation, treatment zone 6 in casing 2 extends from beneath conduit 8 to spraying device 18 and measures approximately 950 feet. Under these operating conditions a bottom hole pressure of 1005 p.s.i.g. exists, and approximately 1060 g.p.m. of water is required to absorb essentially all of the hydrogen sulfide from the 25 MM s.c.f.p.d. stream of sour natural gas considered.

The treating zone provided by this example of the present method is over 10 times as long as that which is practical in conventional scrubbing towers, and this length enables equilibrium conditions essentially to be reached during passage of the gas stream through the water. Concentration of hydrogen sulfide in the gas flashed or stripped from the sour water in separating equipment is high, enabling low cost recovery of sulphur by conventional means.

Table I below summarizes the economics of treating 25 MM s.c.f.p.d. of sour natural gas containing 15% hydrogen sulfide according to the foregoing utilization of the present method. Summarized for comparison in Table I are the corresponding economics of treating 50 MM s.c.f.p.d. of the same gas by the most efficient means (glycol-amine) now in common use in the United States. To make the comparison conservative, high bore hole drilling costs have been charged to the present method and no credits have been taken for power which is recoverable from the sour water and absorbed hydrogen sulfide.

*Table I*

|  | Investment in thousands of Dollars ||
|---|---|---|
|  | Present Method | Conventional |
| Drilling, casing, tubing, completion | 42 |  |
| Pumps | 82 |  |
| Aux. equip., instrumentation, etc | 170 |  |
| Housing, miscellaneous | 60 | 797 |
| Treating plant |  | 1,497 |
| Boiler plant |  | 612 |
| Electric generating plant |  | 81 |
| Contingency | 71 | 390 |
| Total | 425 | 3,377 |

|  | Operating Cost, Dollars Per Day ||
|---|---|---|
| Gas loss, fuel and shrinkage, 10¢/M c.f. | 21 | 940 |
| Pumping at 1¢/kwh | 151 |  |
| Operation, maintenance | 35 | 617 |
| Water makeup | 2 | 118 |
| General and Admin., miscellaneous | 48 | 181 |
| Fixed charges and return: 15% of investment | 174 | 1,350 |
| Total | 431 | 3,206 |
| Treated Gas, M s.c.f.p.d | 21,040 | 35,616 |
| Treating Cost, cents/M. c.f. of treated gas | 2.0 | 9.0 |

For the reasons previously outlined, treating costs increase rapidly in conventional plants as hydrogen sulfide concentrations increase in the sour input gas. By contrast, such increases are moderate in installations designed to utilize the present method, since an increased water flow rate through the treatment zone is all that is required. Large quantities of natural gas now in reserve have hydrogen sulfide contents too high for economic treatment by conventional means. The present method makes such treatment commercially feasible. FIGURE 7 shows graphically how the two compare as hydrogen sulfide concentrations increase.

Costs reflected by the curve for the conventional glycol-amine method in FIGURE 7 are for operation at plant capacity. In conventional plants, treating costs also increase rapidly with decreasing plant capacity. On the other hand, installations utilizing the present method may be attractive costwise when designed for input capacities as low as 1 MM s.c.f.p.d. Such an installation could process gas containing 15% hydrogen sulfide for a calculated cost of 4.9¢/M c.f. of treated product.

Substantial reserves of natural gas are available at well head pressures ranging from 2000 to 5000 p.s.i.g. and above. In current practice, the potential energy present in a high pressure well-head gas stream is dissipated by a choke in the Christmas tree because of the cost and risk of transmitting gas in field gathering systems at such high pressure to points where this energy can be recovered usefully. Because utilizations of the present method are capable of low cost treatment of small volumes of natural gas to remove impurities or recover liquid hydrocarbons therefrom, the instant invention makes practical useful recovery of such energy to reduce treatment costs still further.

This may be done by situating the treatment zone in a portion of the well casing above the producing horizon, as illustrated in FIGURES 2, 4 and 6, or by "twinning" the well with a high pressure treatment installation adjacent to it. According to this adaptation, high pressure gas is fed first to the treatment zone and then through a power recovery device, such as a turbine, instead of a choke, placed downstream from the treatment zone. The output of the turbine is utilized to power the absorbent pumps and auxiliary equipment, and compressors, when necessary otherwise, are eliminated. Because of the simplicity of such an installation, full automation is practical and the installation may be left to operate unattended in the field for long periods of time.

Other gas impurities can be absorbed and removed from fluid streams in a manner similar to that just described. The embodiment of the present method chosen, the absorbent utilized, and the flow rates and other operating conditions selected must be determined according to the solubilities of the impurities encountered and by other properties of the gas streams to be treated. Concerning absorbents, for example, an aqueous solution of an alkaline carbonate, propylene carbonate, glycerol triacetate, butoxy diethylene glycol acetate and methoxy triethylene glycol acetate are reported to be useful in removing carbon dioxide from natural gas. Table II below compares the calculated cost of scrubbing hydrogen sulfide and carbon dioxide in concentrations of 15% and 28.5%, respectively, from natural gas with water, using spray columns as illustrated in FIGURE 1, and liquid spray columns as illustrated in FIGURE 3. For this comparison, the gas is received from the pipeline at 1050 p.s.i.g. and introduced directly to the bottom of the treatment vessel in each case, after compression, where necessary, as indicated. The treated gas is returned to the pipeline at 1,000 p.s.i.g. in each case, and no credits have been taken for power which is recoverable from the sour water or the high pressure.

*Table II*

| Conditions | 15% $H_2S$ | | 28.5% $CO_2$ | |
|---|---|---|---|---|
| | Spray | Liquid | Spray | Liquid |
| Depth, ft | 1,000 | 2,000 | 1,000 | 2,000 |
| Capacity, MM s.c.f.p.d | 25 | 25 | 24 | 20 |
| Water, g.p.m | 1,060 | 750 | 3,200 | 2,280 |
| Casinghead pressure, p.s.i.g | 1,000 | 1,000 | 1,000 | 700 |
| Pump size, H.P | 670 | 450 | 2,070 | 940 |
| Bottom hole pressure, p.s.i.g | 1,005 | 1,375 | 1,005 | 1,042 |
| Gas inlet pressure, p.s.i.g | 1,050 | 1,550 | 1,050 | 1,132 |
| Compressor size, H.P | 0 | 750 | 0 | 640 |
| Investment, M$: | | | | |
| Drilling, casing, tubing, compl | 42 | 77 | 42 | 79 |
| Compressors, pumps | 82 | 185 | 180 | 194 |
| Aux. equipment, instrumentation | 170 | 160 | 205 | 180 |
| Housing, miscellaneous | 60 | 80 | 70 | 80 |
| Contingency | 71 | 100 | 99 | 107 |
| Total | 425 | 602 | 596 | 640 |
| Operating Cost, $/Day: | | | | |
| Gas loss at 10¢/M c.f | 21 | 20 | 42 | 39 |
| Pumping and compression @ 1¢/kwh | 151 | 215 | 401 | 283 |
| Operation, maint., G. and A., misc | 85 | 122 | 229 | 161 |
| Fixed chgs. and ret: 15% invest | 174 | 247 | 245 | 263 |
| | 431 | 604 | 917 | 746 |
| Treated Gas, M c.f./day | 21,040 | 21,150 | 16,740 | 13,910 |
| Treating Cost, cents/M c.f. of treated gas | 2.0 | 2.9 | 5.5 | 5.4 |

As Table II indicates, costs using a spray column are generally lower than those using a liquid column when scrubbing hydrogen sulfide. An exception is when the gas is available at very high pressure in, for example, the producing formation, in which event the embodiment illustrated in FIGURE 4 can be used to advantage. In carbon dioxide scrubbing, where water requirements and pumping costs are higher due to the lower solubility of carbon dioxide in water, treating costs using a liquid column are slightly lower. Calculated costs for scrubbing carbon dioxide with water according to the present method are substantially lower than those for processes utilizing methods currently in common use in the United States. Using such methods, 10¢ per M s.c.f. of product is considered a reasonable cost for treating gas which is 28.5% carbon dioxide. Using according to the present method liquids which have greater preferential absorbing capacities for carbon dioxide than does water results in reducing considerably the costs for scrubbing carbon dioxide from natural gas shown in Table II.

Cost advantages of the spray columns result from savings in investment and operating costs associated with compression of feed gas. Cost advantages using liquid columns result from lower water requirements and water injection pressures. The higher water flow rate for spray columns is caused by lower solubility at the lower treating pressures. It is because each of these factors weighs differently, depending upon the application of the present method under consideration, that each embodiment thereof must be properly selected and its design optimized according to the particular investment and operating cost considerations involved.

The utilizations and embodiments of the invention herein described and illustrated are to be taken as examples of same. Manifestly, various modifications of the method and its suggested embodiments, as well as the utilization of either or both in other types of treating, for example, to upgrade air or treat synthesis, refinery, manufactured and other industrial gas streams may be restored to without departing from the spirit and scope of this invention, as defined in the sub-joined claims.

We claim:
1. In the art of changing the concentration of a component of a gaseous mixture by selective absorption, the method which comprises introducing an absorbent having a preferential absoring capacity for said component into the top of a treatment zone contained in a downwardly extending lined hole in the earth and supported thereby, said treatment zone having a vertical dimension which exceeds 100 feet and which exceeds 33 times the square root of the average cross-sectional area in square feet thereof which is devoted to contacting; flowing said absorbent downwardly in said treatment zone; introducing said mixture to said treatment zone near the lower end thereof; flowing said mixture upwardly throughout said treatment zone in countercurrent contact at high pressure with said absorbent flowing downwardly therein, and thereby preferentially absorbing said component in said absorbent; maintaining throughout said treatment zone pressure, in addition to hydrostatic pressure, which is substantially in excess of atmospheric pressure; flowing from a point near the top of said treatment zone the unabsorbed fraction of said mixture containing a lower concentration of said component than was present in said mixture initially; withdrawing said fraction from said hole; separately withdrawing enriched absorbent from a point near the lower end of said treatment zone; and flowing said enriched absorbent from said hole.

2. The method according to claim 1 including the steps of flashing said enriched absorbent at an intermediate pressure following flowing said enriched absorbent from said hole and recycling the gaseous mixture thus evolved to said treatment zone.

3. In the art of changing the concentration of a component of a gaseous mixture by selective absorption, the method which comprises introducing an absorbent having a preferential absorbing capacity for said component into the top of a treatment zone contained in a downwardly extending lined hole in the earth and supported thereby, said treatment zone having a vertical dimension which exceeds 100 feet, exceeds 33 times the square root of the average cross-sectional area in square feet thereof which is devoted to contacting, and extends the major portion of the vertical dimension of said hole, said vertical dimension of said hole being measured from the lower end of said treatment zone; flowing said absorbent downwardly in said treatment zone; introducing said mixture to said treatment zone near the lower end thereof; flowing said mixture upwardly throughout said treatment zone in countercurrent contact at high pressure with said absorbent flowing downwardly therein, and thereby preferentially absorbing said component in said absorbent; maintaining throughout said treatment zone pressure, in addition to hydrostatic pressure, which is substantially in excess of atmospheric pressure; flowing from a point near the top of said treatment zone the unabsorbed fraction of said mixture containing a lower concentration of said component than was present in said mixture initially; withdrawing said fraction from said hole; separately withdrawing enriched absorbent from a point near the lower end of said treatment zone; and flowing said enriched absorbent from said hole.

4. In the art of changing the concentration of a component of a gaseous mixture by selective absorption, the method which comprises introducing an absorbent having a preferential absorbing capacity for said component into the top of a treatment zone bounded peripherally, throughout the major portion of the length thereof, by the wall of a downwardly extending lined hole in the earth and supported thereby, said treatment zone having a vertical dimension which exceeds 100 feet and which exceeds 33 times the square root of the average cross-sectional area in square feet thereof which is devoted to contacting; flowing said absorbent downwardly in said treatment zone; introducing said mixture to said treatment zone near the lower end thereof; flowing said mixture upwardly throughout said treatment zone in countercurrent contact at high pressure with said absorbent flowing downwardly therein, and thereby preferentially absorbing said component in said absorbent; maintaining throughout said treatment zone pressure, in addition to hydrostatic pressure, which is substantially in excess of atmospheric pressure; flowing from a point near the top of said treatment zone the unabsorbed fraction of said mixture containing a lower concentration of said component than was present in said mixture initially; withdrawing said fraction from said hole; separately withdrawing enriched absorbent from a point near the lower end of said treatment zone; and flowing said enriched absorbent from said hole.

5. In the art of changing the concentration of a component of a gaseous mixture by selective absorption, the method which comprises introducing an absorbent having a preferential absorbing capacity for said component into the top of a treatment zone bounded peripherally, throughout the major portion of the length thereof, by the wall of a downwardly extending lined hole in the earth and supported thereby, said treatment zone having a vertical dimension which exceeds 100 feet, exceeds 33 times the square root of the average cross-sectional area in square feet thereof which is devoted to contacting, and extends the major portion of the vertical dimension of said hole, said vertical dimension of said hole being measured from the lower end of said treatment zone; flowing said absorbent downwardly in said treatment zone; introducing said mixture to said treatment zone near the lower end thereof; flowing said mixture upwardly throughout said treatment zone in countercurrent contact at high pressure with said absorbent flowing downwardly therein, and thereby preferentially absorbing said component in said absorbent; maintaining throughout said treatment zone pressure, in addition to hydrostatic pressure, which is substantially in excess or atmospheric pressure; flowing from a point near the top of said treatment zone the unabsorbed fraction of said mixture containing a lower concentration of said component than was present in said mixture initially; withdrawing said fraction from said hole; separately withdrawing enriched absorbent from a point near the lower end of said treatment zone; and flowing said enriched absorbent from said hole.

6. The method of treating a gaseous mixture to change the concentrations of at least two components thereof separately comprising introducing a first absorbent having a preferential absorbing capacity for one of said components into the top of first treatment zone contained in a lower portion of a downwardly extending lined hole in the earth and supported thereby; flowing said first absorbent downwardly in said first treatment zone; introducing said mixture into said first treatment zone near the lower end thereof; flowing said mixture upwardly throughout said first treatment zone in countercurrent contact at high pressure with said first absorbent flowing downwardly therein, and thereby preferentially absorbing said one component in said first absorbent; flowing from a point near the top of said first treatment zone the unabsorbed fraction of said mixture containing a lower concentration of said one component than was present in said mixture initially; introducing a second absorbent having a preferential absorbing capacity for another of said components into the top of a second treatment zone situated in said hole above said first treatment zone; flowing said second absorbent downwardly in said second treatment zone; introducing said fraction to said second treatment zone near the lower end thereof; flowing said fraction upwardly throughout said second treatment zone in countercurrent contact at high pressure with said second absorbent flowing downwardly therein, and thereby preferentially absorbing said another component in said second absorbent, at least one of said treatment zones having a vertical dimension which exceeds 100 feet and which exceeds 33 times the square root of the average cross-sectional area in square feet thereof which is devoted to contacting; maintaining throughout said first and second treatment zones pressure, in addition to hydrostatic pressure, which is substantially in excess of atmospheric pressure; flowing from a point near the top of said second treatment zone the unabsorbed remainder of said fraction containing a lower concentration of said another component than was present in said fraction initially; withdrawing said remainder from said hole; separately withdrawing enriched said first and second absorbents from points near the lower ends of said first and second treatment zones, respectively; and separately flowing enriched said first and second absorbents from said hole.

7. The method of treating sour natural gas to decrease the concentration of an acidic constituent thereof which comprises introducing an absorbent having a preferential absorbing capacity for said constituent into the top of a treatment zone contained in a downwardly extending lined hole in the earth and supported thereby, said treatment zone having a vertical dimension which exceeds 100 feet and which exceeds 33 times the square root of the average cross-sectional area in square feet thereof which is devoted to contacting; flowing said absorbent downwardly in said treatment zone; introducing said natural gas to said treatment zone near the lower end thereof; flowing said natural gas upwardly throughout said treatment zone in countercurrent contact at high pressure with said absorbent flowing downwardly therein, and thereby preferentially absorbing said constituent in said absorbent; maintaining throughout said treatment zone pressure, in addition to hydrostatic pressure, which is substantially in excess of atmospheric pressure; flowing from a point near the top of said treatment zone the unabsorbed fraction of said natural gas containing a lower concentration of said constituent than was present in said natural gas initially; withdrawing said fraction from said hole; separately withdrawing sour absorbent from a point near the lower end of said treatment zone, and flowing said sour absorbent from said hole.

8. The method according to claim 7 including the steps of flashing said sour absorbent at an intermediate pressure following flowing said sour absorbent from said hole and recycling the gaseous mixture thus evolved to said treatment zone.

9. The method according to claim 7 wherein said natural gas is introduced to said treatment zone from a formation in the earth below said zone.

10. The method according to claim 7 wherein said absorbent consists essentially of water.

11. The method of treating sour natural gas to decrease the concentration of an acidic constituent thereof which comprises introducing an absorbent having a preferential absorbing capacity for said constituent into the top of a treatment zone contained in a downwardly extending lined hole in the earth and supported thereby, said treatment zone having a vertical dimension which exceeds 100 feet, exceeds 33 times the square root of the average cross-sectional area in square feet thereof which is devoted to contacting, and extends the major portion of the vertical dimension of said hole, said vertical dimension of said hole being measured from the lower end of said treatment zone; flowing said absorbent downwardly in said treatment zone; introducing said natural gas to said treatment zone near the lower end thereof; flowing said natural gas upwardly throughout said treatment zone in countercurrent contact at high pressure with said absorbent flowing downwardly therein, and thereby preferentially absorbing said constituent in said absorbent; maintaining throughout said treatment zone pressure, in addition to hydrostatic pressure, which is substantially in excess of atmospheric pressure; flowing from a point near the top of said treatment zone the unabsorbed fraction of said natural gas containing a lower concentration of said constituent than was present in said natural gas initially; withdrawing said fraction from said hole; separately withdrawing sour absorbent from a point near the lower end of said treatment zone; and flowing said sour absorbent from said hole.

12. The method of treating sour natural gas to decrease the concentration of an acidic constituent thereof which comprises introducing an absorbent having a preferential absorbing capacity for said constituent into the top of a treatment zone bounded peripherally, throughout the major portion of the length thereof, by the wall of a downwardly extending lined hole in the earth and supported thereby, said treatment zone having a vertical dimension which exceeds 100 feet and which exceeds 33 times the square root of the average cross-sectional area in square feet thereof which is devoted to contacting; flowing said absorbent downwardly in said treatment zone; introducing said natural gas to said treatment zone near the lower end thereof; flowing said natural gas upwardly throughout said treatment zone in countercurrent contact at high pressure with said absorbent flowing downwardly therein, and thereby preferentially absorbing said constituent in said absorbent; maintaining throughout said treatment zone pressure, in addition to hydrostatic pressure, which is substantially in excess of atmospheric pressure; flowing from a point near the top of said treatment zone the unabsorbed fraction of said natural gas containing a lower concentration of said constituent than was present in said natural gas initially; withdrawing said fraction from said hole; separately withdrawing sour absorbent from a point near the lower end of said treatment zone; and flowing said sour absorbent from said hole.

13. The method of treating sour natural gas to decrease the concentration of an acidic constituent thereof which comprises introducing an absorbent having a preferential absorbing capacity for said constituent into the top of a treatment zone bounded peripherally, throughout the major portion of the length thereof, by the wall of a downwardly extending lined hole in the earth and supported thereby, said treatment zone having a vertical dimension which exceeds 100 feet, exceeds 33 times the square root of the average cross-sectional area in square feet thereof which is devoted to contacting, and extends the major portion of the vertical dimension of said hole, said vertical dimension of said hole being measured from the lower end of said treatment zone; flowing said absorbent downwardly in said treatment zone; introducing natural gas to said treatment zone near the lower end thereof; flowing said natural gas upwardly throughout said treatment zone in countercurrent contact at high pressure with said absorbent flowing downwardly therein, and thereby preferentially absorbing said constituent in said absorbent; maintaining throughout said treatment zone pressure, in addition to hydrostatic pressure, which is substantially in excess of atmospheric pressure; flowing from a point near the top of said treatment zone the unabsorbed fraction of said natural gas containing a lower concentration of said constituent than was present in said natural gas initially; withdrawing said fraction from said hole; separately withdrawing sour absorbent from a point near the lower end of said treatment zone; and flowing said sour absorbent from said hole.

14. The method of treating sour natural gas to decrease the concentration of an acidic constituent and a heavier hydrocarbon therein separately comprising introducing a first absorbent having a preferential absorbing capacity for said constituent into the top of a first treatment zone contained in a lower portion of a downwardly extending lined hole in the earth and supported thereby; flowing said first absorbent downwardly in said first treatment zone; introducing said natural gas into said first treatment zone near the lower end thereof; flowing said natural gas upwardly throughout said first treatment zone in countercurrent contact at high pressure with said first absorbent flowing from a point near the top of said first treatment zone the unabsorbed fraction of said natural gas containing a lower concentration of said constituent than was present in said natural gas initially; introducing a second absorbent consisting essentially of a hydrocarbon oil into the top of a second treatment zone situated in said hole above said first treatment zone; flowing said second absorbent downwardly in said second treatment zone; introducing said fraction to said second treatment zone near the lower end thereof; flowing said fraction upwardly throughout said second treatment zone in countercurrent contact at high pressure with said second absorbent flowing downwardly therein, and thereby preferentially absorbing said heavier hydrocarbon in said second absorbent, at least one of said treatment zones having a vertical dimension which exceeds 100 feet and which exceeds 33 times the square root of the average cross-sectional area in square feet thereof which is devoted to contacting; maintaining throughout said first and second treatment zones pressure, in addition to hydrostatic pressure, which is substantially in excess of atmospheric pressure; flowing from a point near the top of said second treatment zone the unabsorbed remainder of said fraction containing a lower concentration of said heavier hydrocarbon than was present in said fraction initially; withdrawing said remainder from said hole; separately withdrawing sour said first absorbent and enriched said second absorbent from points near the lower ends of said first and second treatment zones, respectively; and separately flowing sour said first absorbent and enriched said second absorbent from said hole.

15. The method of treating a gaseous mixture containing hydrogen and an acidic constituent to reduce the concentration of said constituent which comprises introducing an absorbent having a preferential absorbing capacity for said constituent into the top of a treatment zone contained in a downwardly extending lined hole in the earth and supported thereby, said treatment zone having a vertical dimension which exceeds 100 feet and which exceeds 33 times the square root of the average cross-sectional area in square feet thereof which is devoted to contacting; flowing said adsorbent downwardly in said treatment zone; introducing said mixture to said treatment zone near the lower end thereof; flowing said mixture upwardly throughout said treatment zone in countercurrent contact at high pressure with said absorbent flowing downwardly therein, and thereby preferentially absorbing said constituent in said absorbent; maintaining throughout said treatment zone pressure, in addition to hydrostatic pressure, which is substantially in excess of atmospheric pressure; flowing from a point near the top of said treatment zone the unabsorbed fraction of said mixture containing a lower concentration of said constituent than was present in said mixture initially; withdrawing said fraction from said hole; separately withdrawing sour absorbent from a point near the lower end of said treatment zone; and flowing said sour absorbent from said hole.

16. The method of treating a gaseous mixture containing hydrogen and an acidic constituent to reduce the concentration of said constituent which comprises introducing an absorbent having a preferential absorbing capacity for said constituent into the top of a treatment zone contained in a downwardly extending lined hole in the earth and supported thereby, said treatment zone having a vertical dimension which exceeds 100 feet, exceeds 33 times the square root of the average cross-sectional area in square feet thereof which is devoted to contacting, and extends the major portion of the vertical dimension of said hole, said vertical dimension of said hole being measured from the lower end of said treatment zone; flowing said absorbent downwardly in said treatment zone; introducing said mixture to said treatment zone near the lower end thereof; flowing said mixture upwardly throughout said treatment zone in countercurrent contact at high pressure with said absorbent flowing downwardly therein, and thereby preferentially absorbing said constituent in said absorbent; maintaining throughout said treatment zone pressure, in addition to hydrostatic pressure, which is substantially in excess of atmospheric pressure; flowing from a point near the top of said treatment zone the unabsorbed fraction of said mixture containing a lower concentration of said constituent than was present in said mixture initially; withdrawing said fraction from said hole; separately withdrawing sour absorbent from a piont near the lower end of said treatment zone; flowing said sour absorbent from said hole; renewing said sour absorbent by removing said constituent; and recycling renewed absorbent to the top of said treatment zone.

17. The method of treating a gaseous mixture containing nitrogen and an acidic constituent to reduce the concentration of said constituent which comprises introducing an absorbent having a preferential absorbing capacity for said constituent into the top of a treatment zone contained in a downwardly extending lined hole in the earth and supported thereby, said treatment zone having a vertical dimension which exceeds 100 feet, exceeds 33 times the square root of the average cross-sectional area in square feet thereof which is devoted to contacting, and extends the major portion of the vertical dimension of said hole, said vertical dimension of said hole being measured from the lower end of said treatment zone; flowing said absorbent downwardly in said treatment zone; introducing said mixture to said treatment zone near the lower end thereof; flowing said mixture upwardly throughout said treatment zone in countercurrent contact at high pressure with said absorbent flowing downwardly therein, and thereby preferentially absorbing said constituent in said absorbent; maintaining throughout said treatment zone pressure, in addition to hydrostatic pressure, which is substantially in excess of atmospheric pressure, flowing from a point near the top of said treatment zone the unabsorbed fraction of said mixture containing a lower concentration of said constituent than was present in said mixture initially; withdrawing said fraction from said hole; separately withdrawing sour absorbent from a point near the lower end of said treatment zone; flowing said sour absorbent from said hole; renewing said sour absorbent by removing said constituent; and recycling renewed absorbent to the top of said treatment zone.

18. The method of treating a gaseous mixture containing nitrogen and carbon dioxide to reduce the concentration of said carbon dioxide which comprises introducing an absorbent having a preferential absorbing capacity for said carbon dioxide into the top of a treatment zone bounded peripherally, throughout the major portion of the length thereof, by the wall of a downwardly extending lined hole in the earth and supported thereby, said treatment zone having a vertical dimension which exceeds 100 feet and which exceeds 33 times the square root of the average cross-sectional area in square feet thereof which is devoted to contacting; flowing said absorbent downwardly in said treatment zone; introducing said mixture to said treatment zone near the lower end thereof; flowing said mixture upwardly throughout said treatment zone in countercurrent contact at high pressure with said absorbent flowing downwardly therein, and thereby preferentially absorbing said carbon dioxide in said absorbent; maintaining throughout said treatment zone pressure, in addition to hydrostatic pressure, which is substantially in excess of atmospheric pressure; flowing from a point near the top of said treatment zone the unabsorbed fraction of said mixture containing a lower concentration of said carbon dioxide than was present in said mixture initially; withdrawing said fraction from said hole; separately withdrawing sour absorbent from a point near the lower end of said treatment zone; flowing said sour absorbent from said hole; renewing said sour absorbent by removing said carbon dioxide; and recycling renewed absorbent to the top of said treatment zone.

19. The method of recovering a light olefin from a gaseous mixture containing the same and hydrogen which comprises introducing an absorbent having a preferential absorbing capacity for said olefin into the top of a treatment zone contained in a downwardly extending lined hole in the earth and supported thereby, said treatment zone having a vertical dimension which exceeds 100 feet and which exceeds 33 times the square root of the average cross-sectional area in square feet thereof which is devoted to contacting; flowing said absorbent downwardly in said treatment zone; introducing said mixture to said treatment zone near the lower end thereof; flowing said mixture upwardly throughout said treatment zone in countercurrent contact at high pressure with said absorbent flowing downwardly therein, and thereby preferentially absorbing said olefin in said absorbent; maintaining throughout said treatment zone pressure, in addition to hydrostatic pressure, which is substantially in excess of atmospheric pressure; flowing from a point near the top of said treatment zone the unabsorbed fraction of said mixture containing a lower concentration of said olefin than was present in said mixture initially; withdrawing said fraction from said hole; separately withdrawing olefin-enriched absorbent from a point near the lower end of said treatment zone; and flowing said olefin-enriched absorbent from said hole.

20. The method of treating air to produce a nitrogen-enriched stream and an oxygen-enriched stream which comprises introducing an absorbent having a preferential absorbing capacity for oxygen into the top of a treatment zone bounded peripherally, throughout the major portion of the length thereof, by the wall of a downwardly extending lined hole in the earth and supported thereby, said treatment zone having a vertical dimension which exceeds 100 feet and which exceeds 33 times the square root of the average cross-sectional area in square feet thereof which is devoted to contacting; flowing said absorbent downwardly in said treatment zone; introducing said air to said treatment zone near the lower end thereof; flowing said air upwardly throughout said treatment zone in countercurrent contact at high pressure with said absorbent flowing downwardly therein, and thereby preferentially absorbing said oxygen in said absorbent; maintaining throughout said treatment zone pressure, in addition to hydrostatic pressure which is substantially in excess of atmospheric pressure; flowing from a point near the top of said treatment zone the unabsorbed fraction of said air containing a lower concentration of said oxygen than was present in said air initially; withdrawing said fraction from said hole; separately withdrawing oxygen-enriched absorbent from a point near the lower end of said treatment zone; flowing said oxygen-enriched absorbent from said hole; renewing said oxygen-enriched absorbent by removing said oxygen; and recycling renewed absorbent to the top of said treatment zone.

References Cited in the file of this patent

UNITED STATES PATENTS

| | | |
|---|---|---|
| 1,852,763 | Trotter | Apr. 5, 1932 |
| 2,688,368 | Rodgers et al. | Sept. 7, 1954 |
| 2,723,001 | Hoff | Nov. 8, 1955 |
| 2,792,903 | Hoff | May 21, 1957 |
| 2,926,751 | Kohl et al. | Mar. 1, 1960 |
| 2,926,752 | Redemann et al. | Mar. 1, 1960 |
| 2,926,753 | Kohl et al. | Mar. 1, 1960 |